United States Patent
Yang et al.

(10) Patent No.: US 9,452,501 B2
(45) Date of Patent: Sep. 27, 2016

(54) TOOL MAGAZINE AND MACHINE USING THE SAME

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Tian-En Zhang, Shenzhen (CN); Wei-Chuan Zhang, Shenzhen (CN); Jian-Shi Jia, Shenzhen (CN); Yang-Mao Peng, Shenzhen (CN); Jian Qu, Shenzhen (CN); Feng-Hua Chen, Shenzhen (CN); Zhen-Guang Xu, Shenzhen (CN); Jing-Shuang Sui, Shenzhen (CN); Da-Qing Zhuang, Shenzhen (CN); Jie Li, Shenzhen (CN); Yi Liu, Shenzhen (CN); Jian-min Yu, Shenzhen (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 616 days.

(21) Appl. No.: 13/958,571

(22) Filed: Aug. 4, 2013

(65) Prior Publication Data
US 2014/0171280 A1    Jun. 19, 2014

(30) Foreign Application Priority Data
Dec. 19, 2012 (CN) .......................... 2012 1 0553855

(51) Int. Cl.
| | |
|---|---|
| *B23Q 3/157* | (2006.01) |
| *B23Q 11/08* | (2006.01) |
| *B23Q 3/155* | (2006.01) |
| *B23Q 1/01* | (2006.01) |

(52) U.S. Cl.
CPC ....... *B23Q 3/15526* (2013.01); *B23Q 3/15706* (2013.01); *B23Q 11/08* (2013.01); *B23Q 1/012* (2013.01); *Y10T 409/308288* (2015.01); *Y10T 483/115* (2015.01); *Y10T 483/17* (2015.01); *Y10T 483/1793* (2015.01); *Y10T 483/1809* (2015.01); *Y10T 483/1827* (2015.01)

(58) Field of Classification Search
CPC ................................................... Y10T 483/115
USPC ............................................................ 483/3
See application file for complete search history.

(56) References Cited

U.S. PATENT DOCUMENTS

| | | | | |
|---|---|---|---|---|
| 4,499,650 | A | * 2/1985 | Cannon | B23Q 3/15526 211/1.53 |
| 5,954,623 | A | * 9/1999 | Davis | B23Q 3/15506 483/34 |

(Continued)

FOREIGN PATENT DOCUMENTS

| | | | |
|---|---|---|---|
| CN | 201015832 Y | * | 2/2008 |
| CN | 201109038 Y | | 9/2008 |
| CN | 201109039 Y | | 9/2008 |
| CN | 101920472 A | | 12/2010 |
| CN | 201940846 U | | 8/2011 |
| CN | 102717287 A | | 10/2012 |

(Continued)

OTHER PUBLICATIONS

Machine Translation of CN 201109039 Y, which CN '039 was published Sep. 3, 2008.*

*Primary Examiner* — Erica E Cadugan
(74) *Attorney, Agent, or Firm* — Zhigang Ma

(57) ABSTRACT

A tool magazine of a machine includes a receiving assembly, a tool bracket, a driving member, and a linking assembly. The receiving assembly defines an opening and includes a mounting gate sealing the opening. The tool bracket is slidably received in the receiving assembly. The driving member is connected to the tool bracket and moves the tool bracket out of the opening. The linking assembly includes a linking member and a first pushing rod. The linking member is fixed to the mounting gate and defines a first pushing groove in its periphery. The first pushing rod slides along the direction of the first pushing groove, causing the mounting gate to rotate open and close.

8 Claims, 6 Drawing Sheets

(56) References Cited

U.S. PATENT DOCUMENTS

2011/0083307 A1* 4/2011 Shih .................. B23Q 3/15706
  483/56
2015/0224617 A1* 8/2015 Kao .................. B23Q 3/15526
  483/28

FOREIGN PATENT DOCUMENTS

| CN | 202742116 U | * | 2/2013 |
| CN | 203266216 U | * | 11/2013 |
| CN | 204339401 U | * | 5/2015 |
| EP | 0901878 A1 | | 3/1999 |

* cited by examiner

TOOL MAGAZINE AND MACHINE USING THE SAME

BACKGROUND

1. Technical Field

The present disclosure relates to a tool magazine, more particularly to a tool magazine with a mounting gate and a machine using the same.

2. Description of Related Art

A machine, such as a lathe or a milling machine, is employed to machine a workpiece into a certain shape. The workpiece usually has different portions that require different machining tools for machining. The machine employs a tool magazine to hold the different types of tools. However, the tool magazine, such as the vertical-type tool magazine or the horizontal-type tool magazine, employs a plurality of driving members to open the tool magazine and position the tools, thus requiring a complicated structure and occupying a relatively large space.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
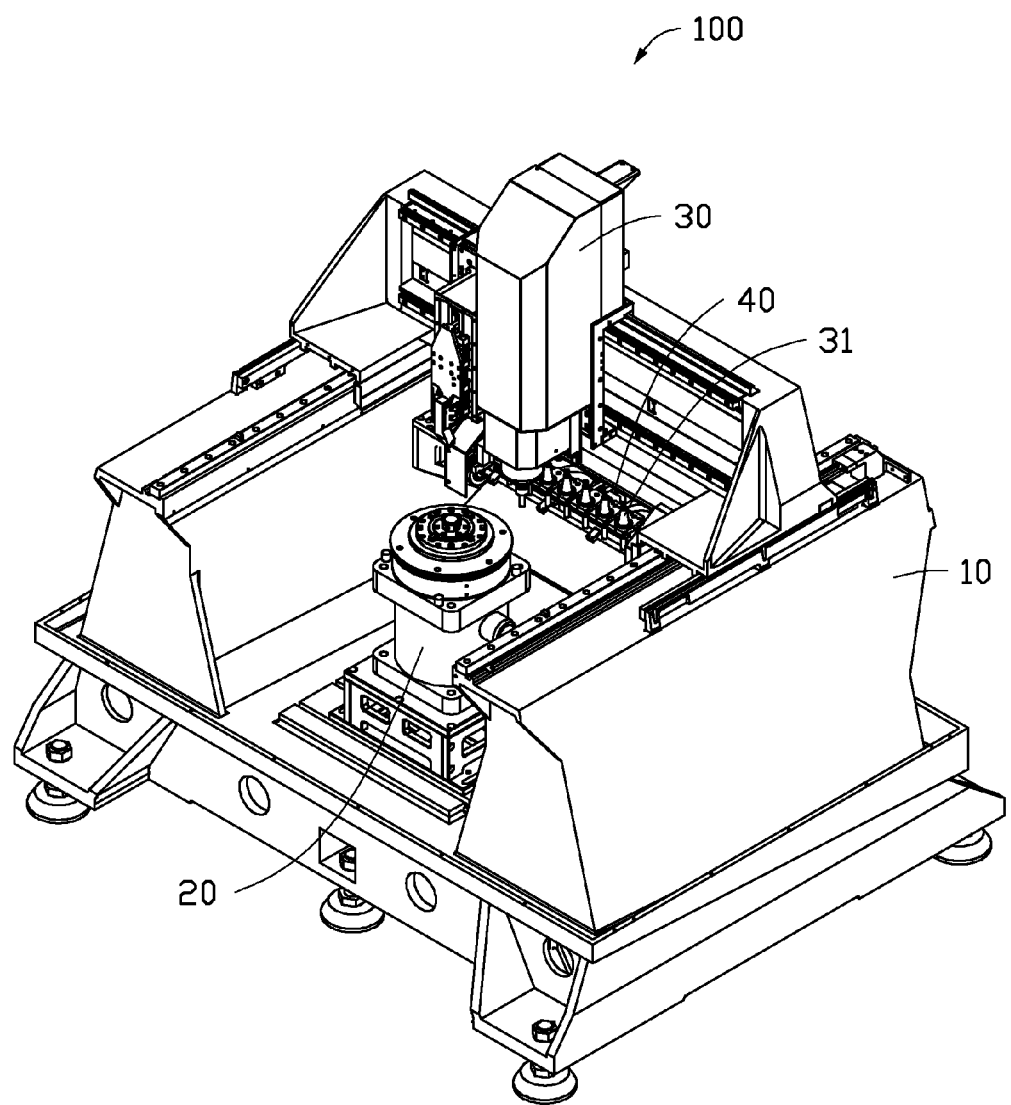
FIG. 1 is an isometric view of an embodiment of a machine employing a tool magazine.
Figure 2:
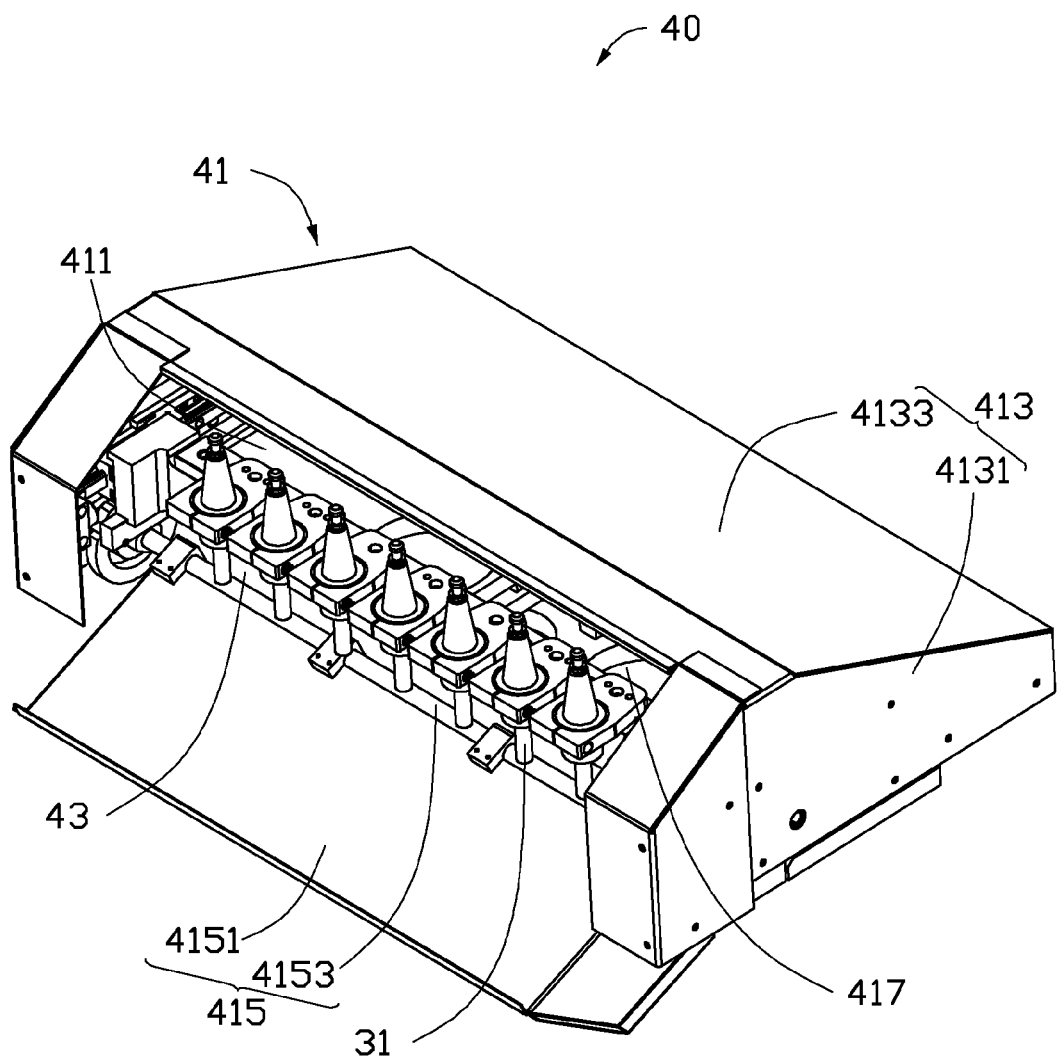
FIG. 2 is an isometric view of the tool magazine of the machine of FIG. 1. The tool magazine includes a receiving assembly and a linking assembly.

FIGS. 1 and 2 show an embodiment of a machine 100 including a machine support 10, a worktable 20, a feeding mechanism 30, and a tool magazine 40. The worktable 20 is rotatably mounted on the machine support 10. The feeding mechanism 30 is slidably mounted on the machine support 10 above the worktable 20. The feeding mechanism 30 is equipped with a plurality of machine tools 31 and drives one machine tool 31 to machine a workpiece (not shown) on the worktable 20. The tool magazine 40 is mounted on the machine support 10 and located adjacent to the worktable 20 to allow easy access for the feeding mechanism 30 to replace one of the machine tools 31. In the embodiment, the machine tool 31 is a milling cutter. In other embodiments, the machine tool 31 may be a lathe tool or any other tool.

Figure 3:
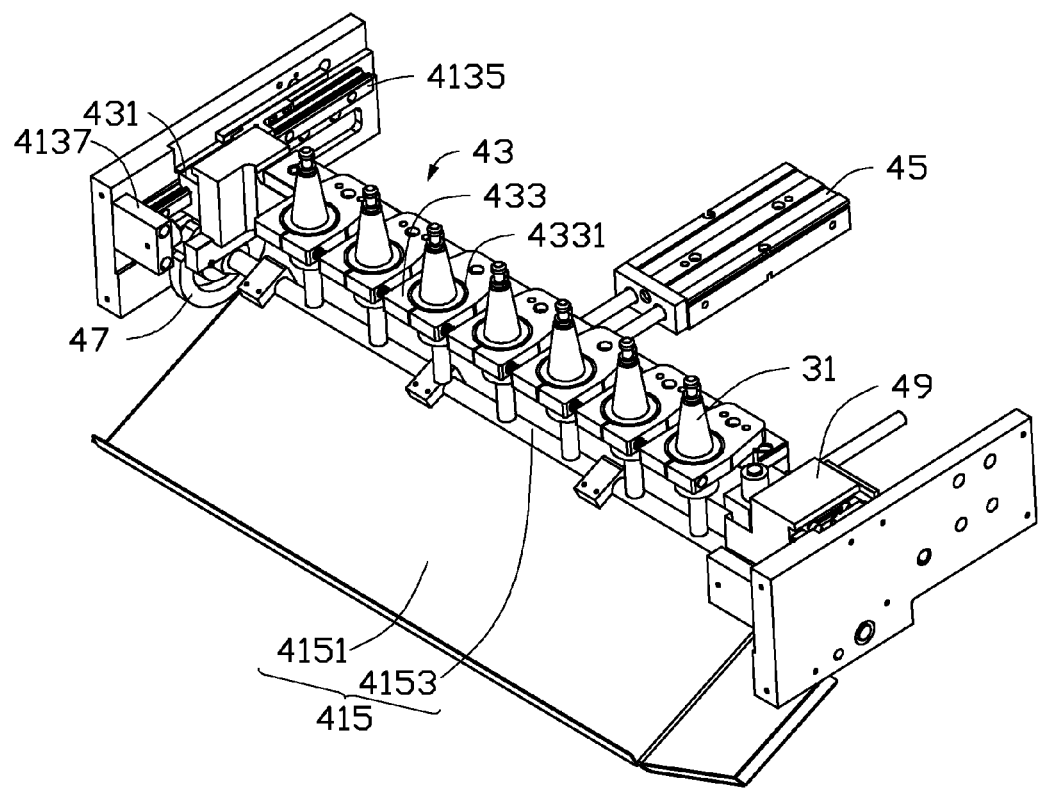
FIG. 3 is an isometric view of the tool magazine of FIG. 2 with a part of the receiving assembly removed.
Figure 4:
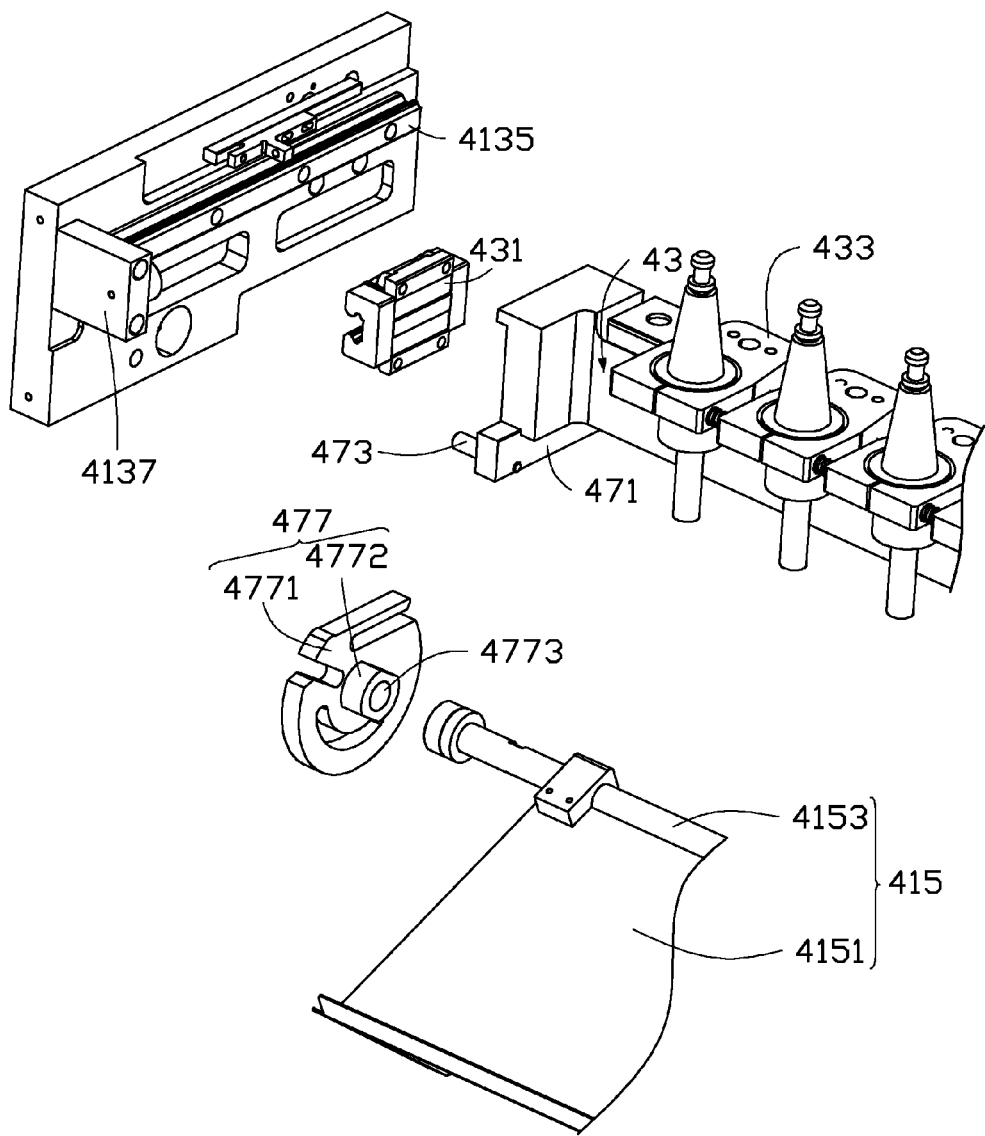
FIG. 4 is a partial, exploded, isometric view of a part of the tool magazine of FIG. 3.

In FIGS. 3 and 4, the tool magazine 40 includes a receiving assembly 41, a tool bracket 43, a driving member 45, a pair of linking assemblies 47, and an auto-align unit 49. The tool bracket 43 is received in the receiving assembly 41. The driving member 45 is connected to the tool bracket 43 and is capable of pushing the tool bracket 43 out of the receiving assembly 41. The linking assembly 47 connects the tool bracket 43 and the receiving assembly 41 to open the tool magazine 40 when the tool bracket 43 is pushed outside. The auto-align unit 49 is mounted on the tool bracket 43 to check whether the machine tool 31 is assembled in a proper position when exchanging.

The receiving assembly 41 includes a bottom plate 411, a shielding cover 413, and a mounting gate 415. The bottom plate 411 is a planar plate, and the shielding cover 413 is canopy-shaped. The shielding cover 413 is assembled onto the bottom plate 411, forming an opening 417 therebetween. The shielding cover 413 includes a pair of side walls 4131 and a top wall 4133, in which the pair of side walls 4131 are connected to the top wall 4133, respectively. Each side wall 4131 connects the bottom plate 411 to the top wall 4133. Each side wall 4131 includes a guiding rail 4135 facing the other side wall 4131 and a blocking portion 4137 at an end of the guiding rail 4135. The pair of guiding rails 4135 is configured parallel to the bottom plate 411. The blocking portion 4137 is capable of limiting a sliding distance of the tool bracket 43. The mounting gate 415 includes a mounting plate 4151 and a pivotal shaft 4153 at a side of the mounting plate 4151. Opposite ends of the pivotal shaft 4153 are rotatably connected to the two side walls 4131, such that the mounting plate 4151 is capable of rotating relative to the pivotal shaft 4153 for sealing or exposing the opening 417.

The tool bracket 43 is bar-shaped, and includes a pair of guiding members 431 at opposite ends thereof and a plurality of tool holders 433 arranged between the pair of guiding members 431. The pair of guiding members 431 slidably engages with the pair of guiding rails 4135, respectively, and is located above the pivotal shaft 4153. The plurality of tool holders 433 is arranged along the tool bracket 43 uniformly. Each tool holder 433 defines a stepped hole 4331 for receiving the machine tool 31. The driving member 45 is assembled to the bottom plate 411 and connected to the tool bracket 43. The driving member 45 is capable of pushing the tool bracket 43 to slide along the pair of guiding rails 4135 toward the opening 417. In the embodiment, the driving member 45 is an air cylinder, and is electrically powered.

Figure 5:
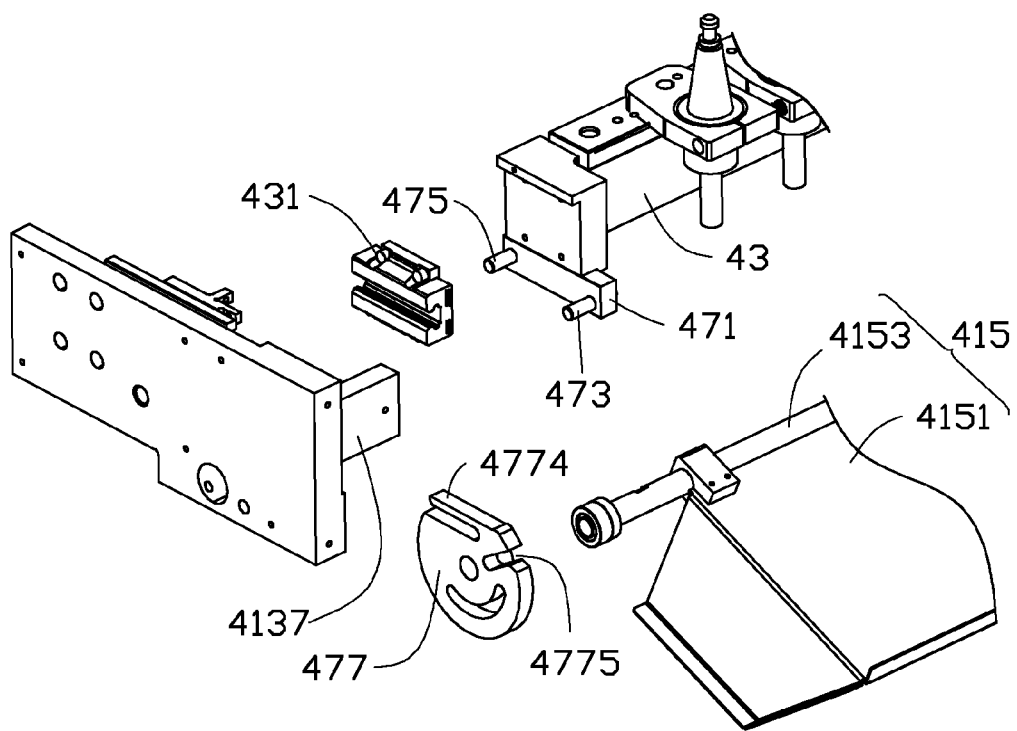
FIG. 5 is similar to FIG. 4, but viewed from another aspect.
Figure 6:
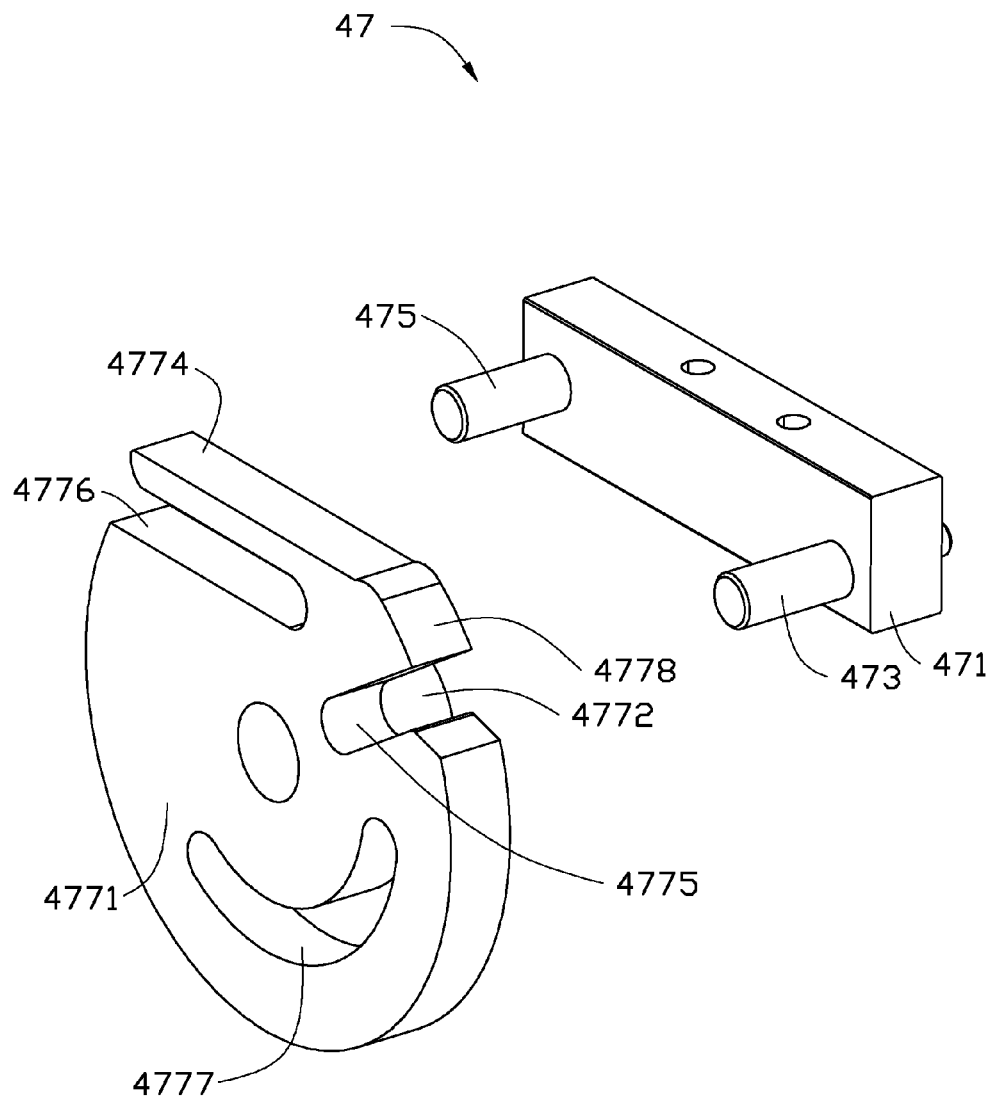
FIG. 6 is an enlarged view of the linking assembly of FIG. 4.

Referring to FIGS. 4 through 6, the pair of linking assemblies 47 is assembled on opposite ends of the tool bracket 43. Each linking assembly 47 includes a fixing block 471 fixed on the ends of the tool bracket 43, a first pushing rod 473, a second pushing rod 475, and a linking member 477. The first pushing rod 473 and the second pushing rod 475 protrude from the fixing block 471, and are parallel to each other. The linking members 477 are substantially disk-shaped and are fixed to the ends of the pivotal shaft 4153. Each linking member 477 include a main body 4771 and a fixing portion 4772 protruding from a side of the main body 4771. The main body 4771 is rotatably mounted on the side wall 4131 of the shielding cover 413, the fixing portion 4772 is coaxial with the main body 4771. Each fixing portion 4772 defines a fixing hole 4773 located in the center thereof through the main body 4771, and the linking member 477 forms a cut surface 4774 at a periphery thereof adjacent to the fixing block 471 of the linking assembly 47. The linking members 477 are sleeved on the pivotal shaft 4153 via the fixing holes 4773, respectively.

Each linking member 477 further defines a first pushing groove 4775, a second pushing groove 4776, and an annular groove 4777. The first pushing groove 4775 cuts through a periphery of the linking member 477 adjacent to a first end of the cut surface 4774. The first pushing groove 4775 extends toward the fixing hole 4773 and is inclined away from the cut surface 4774. The second pushing groove 4776 cuts through a periphery of the linking member 477 adjacent to a second end of the cut surface 4774 opposite to the first end. The second pushing groove 4776 extends along a direction substantially parallel to the cut surface 4774. The main body 4771 forms a sliding inclined surface 4778 between the cut surface 4774 and the first pushing groove 4775. The first pushing rod 473 is slidably received in the first pushing groove 4775, and the second pushing rod 475 is received in the second pushing groove 4776.

A distance between the distal ends of the first pushing groove 4775 and the second pushing groove 4776 is equal to a distance between the first pushing rod 473 and the second pushing rod 475, such that when the first pushing rod 473 exits the first pushing groove 4775, the second pushing rod 475 enters the second pushing groove 4776, and vice versa. In another embodiment, the distance between the distal ends of the first pushing groove 4775 and the second pushing groove 4776 is less than the distance between the first pushing rod 473 and the second pushing rod 475, such that when the first pushing rod 473 leaves the first pushing groove 4775, the second pushing groove 4776 just starts to align with the second pushing rod 475, and vice versa.

In other embodiments, the second pushing groove 4776 and the second pushing rod 475 can be omitted, such that the linking members 477 are rotated by the first pushing rod 473 only, and the main body 4771 of the linking member 477 can be directly fixed to the pivotal shaft 4153, such that the fixing portion 4772 is omitted. The cut surface 4774 prevents interference from other parts when the linking members 477 rotate, but may be omitted in other embodiments if there is sufficient space for the linking members 477 to rotate. The annular groove 4777 is defined in the main body 4771 to reduce the weight of the linking members 477, but can also be omitted in other embodiments.

Referring to FIGS. 1 through 6 again, in assembly of the tool magazine 40, the tool bracket 43 is slidably mounted in the receiving assembly 41. The driving member 45 is received in the receiving assembly 41 and connected to the tool bracket 43. The auto-align unit 49 is mounted on the tool bracket 43. The pair of fixing blocks 471 is fixed to opposite ends of the tool bracket 43. The first pushing rod 473 and the second pushing rod 475 are mounted on the fixing block 471. The linking members 477 are fixedly sleeved on the pivotal shaft 4153 and rotatably mounted on the side wall 4131. The first pushing groove 4775 receives the first pushing rod 473. In assembly of the machine 100, the worktable 20 is mounted on the machine support 10, the tool magazine 40 is mounted on the machine support 10 adjacent to the worktable 20, and the feeding mechanism 30 is mounted on the machine support 10 above the worktable 20.

When exchanging a machine tool 31, the feeding mechanism 30 moves toward the tool magazine 40, and the driving member 45 drives the tool bracket 43 to slide along the pair of guiding rails 4135 toward the opening 417. This pushes the first pushing rod 473 and the second pushing rod 475 toward the opening 417. The first pushing rod 473 pushes against an inner surface of the first pushing groove 4775, causing the second pushing rod 475 to move toward the second pushing groove 4776. This causes the linking members 477 to rotate the mounting plate 4151 around the pivotal shaft 4153, such that the mounting gate 415 opens. Then, the tool bracket 43 moves out of the opening 417.

The feeding mechanism 30 places down one machine tool 31 and grabs another machine tool 31. The auto-align unit 49 checks the assembly position of the machine tool 31, and the machine tool 31 is taken from the tool magazine 40. Then, the driving member 45 withdraws the tool bracket 43, and the linking assemblies 47 rotate the mounting gate 415 to seal the opening 417.

The tool magazine 40 employs the linking assembly 47 to rotate the mounting gate 415 to be opened or closed when the tool bracket 43 moves toward or away from the opening 417. Because only one driving member 45 is employed, the structure of the tool magazine 40 is simplified, and the required space of the tool magazine 40 is reduced.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A tool magazine, comprising:
   a receiving assembly comprising a bottom plate, a shielding cover, and a mounting gate, the shielding cover being assembled to the bottom plate, thereby forming an opening therebetween, the mounting gate opening and closing the opening;
   a tool bracket slidably received in the receiving assembly;
   a driving member connected to the tool bracket and capable of driving the tool bracket out of the receiving assembly through the opening; and
   a linking assembly comprising a linking member and a first pushing rod, wherein the linking member is fixed to the mounting gate, and defines a first pushing groove at a periphery of the linking member, a longitudinal extending direction of the first pushing groove is inclined to the sliding direction of the tool bracket, the first pushing rod is fixed on the tool bracket and is slidably received in the first pushing groove, such that when the tool bracket moves toward the opening, the first pushing rod rotates the linking member, so as to rotate the mounting gate to expose the opening for the tool bracket moving therethrough, and when the tool bracket withdraws into the receiving assembly and away from the opening, the first pushing rod rotates the mounting gate to close the opening.

2. The tool magazine of claim 1, wherein the shielding cover comprises a pair of side walls and a top wall, and the top wall interconnects the pair of side walls, each side wall interconnects the bottom plate and the top wall, and each side wall comprises a respective guiding rail thereon facing the other side wall, the tool bracket comprises a pair of guiding members, with one of the guiding members being located at one end of the tool bracket and the other of the guiding members being located at an opposite end of the tool bracket, the pair of guiding members slidably engages with the pair of guiding rails, respectively.

3. The tool magazine of claim 2, wherein each of the side walls further comprises a respective blocking portion at an end of the respective guiding rail,
   wherein each of the guiding rails extends parallel to the bottom plate, each of the blocking portions limits a sliding distance of the tool bracket, the mounting gate comprises a mounting plate and a pivotal shaft at a side of the mounting plate, and wherein the linking member is fixed to an end of the pivotal shaft and is rotatably connected to one of the side walls.

4. The tool magazine of claim 1, wherein the linking assembly further comprises a second pushing rod fixed to the tool bracket, the second pushing rod is parallel to the first pushing rod, the linking member further defines a second pushing groove at a periphery thereof, the second pushing rod is received in the second pushing groove, and the first pushing groove extends toward a center of the linking member.

5. The tool magazine of claim 4, wherein ends of the first pushing groove and the second pushing groove away from each other have a distance therebetween equal to a distance between the first pushing rod and the second pushing rod, such that when the first pushing rod leaves the first pushing groove, the second pushing rod enters into the second pushing groove, and such that when the first pushing rod enters into the first pushing groove, the second pushing rod leaves the second pushing groove.

6. The tool magazine of claim 4, wherein ends of the first pushing groove and the second pushing groove away from each other have a distance therebetween less than a distance between the first pushing rod and the second pushing rod, such that when the first pushing rod leaves the first pushing groove, the second pushing groove is aligned with the second pushing rod, and such that when the first pushing rod enters into the first pushing groove, the second pushing rod leaves the second pushing groove.

7. The tool magazine of claim 4, wherein the linking member further defines a cut surface at a periphery thereof adjacent to the tool bracket, ends of the first pushing groove and the second pushing groove away from each other are located at opposite ends of the cut surface, and an extending direction of the cut surface is parallel to a longitudinal extending direction of the second pushing groove.

8. The tool magazine of claim 7, wherein the linking member further defines an inclined surface at a periphery thereof, the inclined surface interconnecting the cut surface and the second pushing groove and being inclined with respect to the cut surface and the longitudinal extending direction of the second pushing groove, the linking assembly further comprises a fixing block fixed on an end of the tool bracket, and the first pushing rod and the second pushing rod are arranged on the fixing block.

* * * * *